Jan. 8, 1952     G. H. SCHAFFER     2,581,973
REDUCTION GEAR BOX
Filed May 27, 1949                                    2 SHEETS—SHEET 1

INVENTOR.
GEORGE H. SCHAFFER
BY
ATTORNEY

Jan. 8, 1952     G. H. SCHAFFER     2,581,973
REDUCTION GEAR BOX

Filed May 27, 1949     2 SHEETS—SHEET 2

INVENTOR.
GEORGE H. SCHAFFER
BY
ATTORNEY

Patented Jan. 8, 1952

2,581,973

UNITED STATES PATENT OFFICE 2,581,973

REDUCTION GEAR BOX

George H. Schaffer, Waterbury, Conn.

Application May 27, 1949, Serial No. 95,671

1 Claim. (Cl. 74—438)

This invention relates to gear transmissions, and more particularly to a gear box having a set of speed reduction gears which may be reversely connected so as to provide a speed increase whenever desired.

One object of this invention is to provide an apparatus of the above nature in which the gear set includes an annular gear having teeth on both its inner and outer surfaces, said gear being so arranged as to permit the gear box to be very compact, while providing a high mechanical advantage.

Another object is to provide a device of the above nature, wherein the gears may be quickly and easily removed for purposes of inspection or replacement.

A further object is to provide a device of the above nature which will be simple in construction, inexpensive to manufacture, easy to install and maintain, reversible, having a high power transmitting capacity, and very efficient and durable in use.

With these and other objects in view, there have been illustrated on the accompanying drawing two forms in which the invention may conveniently be embodied in practice.

Figure 1:
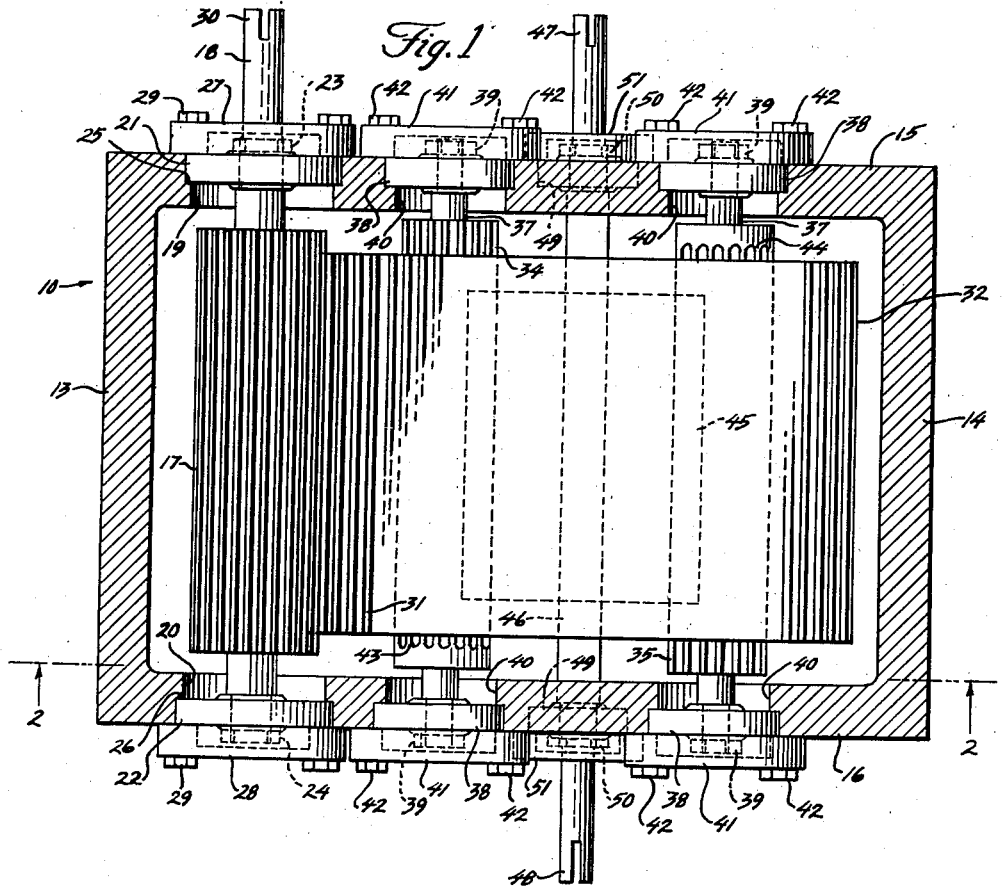
Fig. 1 is a plan view of one form of the improved gear box, the housing being shown in cross-section on the broken line 1—1 of Fig. 2.

Referring now to the drawings in which like reference numerals denote corresponding parts throughout the several views, the numeral 10 indicates an open-topped rectangular housing which is adapted to be closed by means of a cover 11 secured by a plurality of screws 12, and which has side walls 13, 14, and end walls 15, 16.

The left hand portion of the housing 10, as viewed in the drawing, contains an elongated gear 17 of small diameter, which will be hereinafter referred to as the drive gear for purposes of description, although it will be understood that if the gear box is employed for reverse operation, the gear 17 would be the driven gear.

The drive gear 17 is adapted to be inserted into the housing 10 through either of a pair of openings 19, 20 in the end walls 15, 16, respectively, and is fixed upon a horizontal drive shaft 18. In order to support the drive shaft 18, provision is made of a pair of low-friction bearings 21, 22, of any suitable type, such as ball bearings, which are held upon respective reduced end portions of the shaft 18 by means of nuts 23, 24. The bearings 21, 22 are held against outwardly facing shoulders 25, 26 of the openings 19, 20, respectively, by means of grease caps 27, 28 which are secured to the outer surfaces of the walls 15, 16 by screws 29.

In order to permit the drive shaft 18 to be driven from a suitable source of power, said shaft is provided with a slotted end coupling portion 30 which projects outwardly through an aperture in the grease cap 27.

Figure 2:
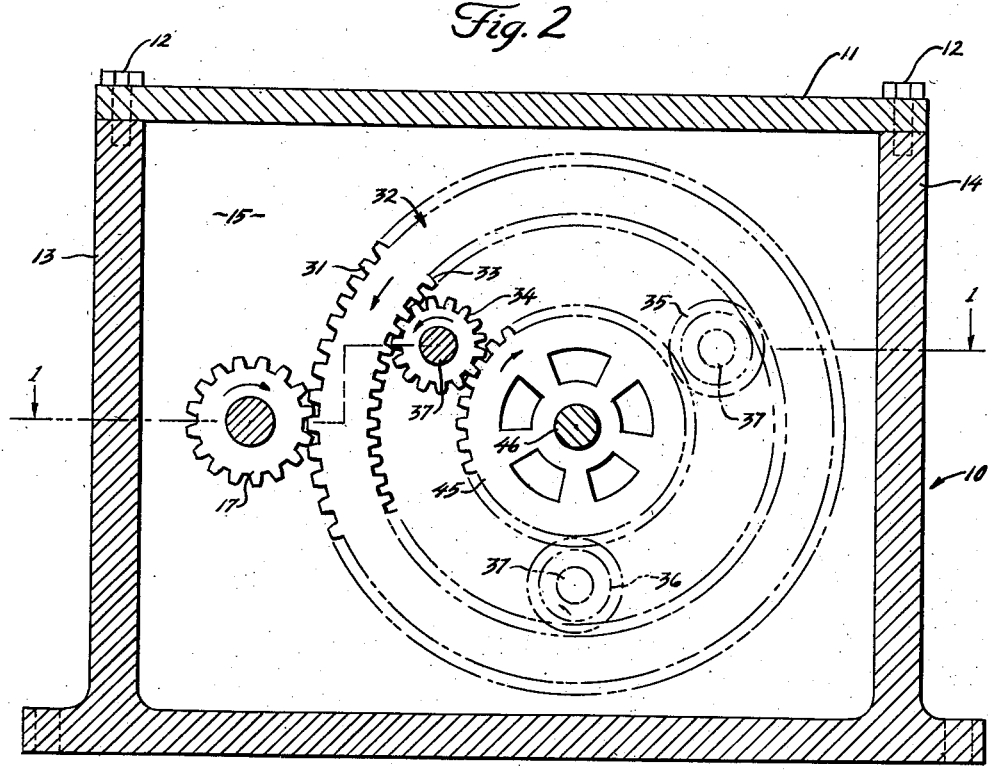
Fig. 2 is a cross-sectional view, on the line 2—2 of Fig. 1.

The drive gear 17 is in mesh with gear teeth 31 formed upon the outer surface of a large annular gear 32, which is also provided with inner gear teeth 33 (Fig. 2). The annular gear 32 is internally supported by means of three symmetrically disposed small intermediate gears 34, 35, 36, the axes of which are fixed with relation to the housing 10, and which are in mesh with the inner teeth 33 of said annular gear 32 so as to be driven thereby.

The small intermediate gears 34, 35, 36 are supported in horizontal positions by means of three shafts 37 which are carried by a plurality of bearings 38 held thereon by means of nuts 39. The bearings 38 are retained in stepped openings 40 in the end walls 15, 16, by means of a plurality of grease caps 41 secured by screws 42.

It will be noted that the openings 40 are of a sufficient diameter to permit the gears 34, 35, 36 to be inserted and removed therethrough, thus facilitating the assembly and maintenance of the gear box.

In order to prevent excessive lateral shifting of the annular gear 32, the small intermediate gear 34 is provided with a cylindrical abutment portion 43 adjacent the end wall 16, while the small intermediate gear 35 is provided with a cylindrical abutment portion 44 adjacent the end wall 15.

Thus, the lateral edges of the inner teeth 33 of the annular gear 32 are adapted to engage one or the other of the abutment portions 43, 44 if any lateral shifting tendency of the annular gear 32 should occur, whereby said gear will be maintained in its proper operating position.

The intermediate gears 34, 35, 36, are in mesh with an inner driven gear 45 which is centrally disposed within the annular gear 32, and which is secured upon a horizontal driven shaft 46 having split coupling portions 47, 48 projecting outwardly of the housing end walls 15, 16. The driven shaft 46 is also provided with a pair of bearings 49, which are held thereon by means of nuts 50, and which are retained in cavities in the end walls 15, 16, respectively, by means of a pair of apertured grease caps 51.

Second form

Figure 3:
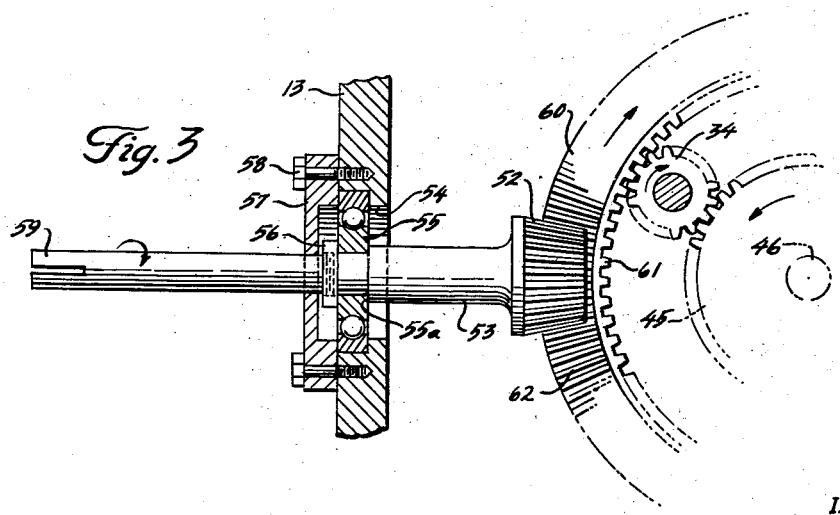
Fig. 3 is a fragmentary cross-sectional view, showing a modified form of annular gear, and the drive means therefor.

If desired, the improved gear box may be modified to provide a right-angle drive, as shown in Fig. 3. In this form of the invention, the drive gear is in the form of a bevel gear 52 mounted on a drive shaft 53, which is journaled in a stepped opening 54 in the side wall 13 by means of a bearing 55.

The bearing 55 is secured against a shoulder 55a upon the drive shaft 53 by means of a nut 56, and is retained in the stepped opening 54 by means of an apertured grease cap 57 secured by screws 58. The drive shaft 53 also comprises an outer end split coupling portion 59 which projects outwardly through the apertured grease cap 57, and may of course, be connected to any suitable source of rotary power.

In this form of the invention, provision is made of an annular gear 60 which is similar to the annular gear 32 in the first form of the invention, and is provided with inner teeth 61 in mesh with the small intermediate gears 34, 35, 36. In the gear 60, however, the outer teeth are omitted, and a flat end surface of said gear 60 is provided with bevel teeth 62 which are in mesh with the bevelled drive gear 52.

It will be understood that the bevel teeth 62 may be provided at either end of the annular gear 60, the drive gear 52 being disposed to mesh with said teeth 62. Thus, the drive gear 52 may be selectively constructed so that the driven shaft 46 will rotate in either a clockwise or counterclockwise direction when the drive shaft 53 is connected to a motor which rotates in a clockwise direction.

Operation

In operation, after the housing 10 has been mounted in the desired location, the coupling portion 30 will be connected to a suitable source of power. Either or both of the coupling portions 47, 48 will then be connected to the machine apparatus to be driven.

If the operator should find it more expedient to drive the gear box from the opposite side thereof, he may easily reverse the position of the drive shaft 18 merely by removing the grease caps 27, 28 and the nut 24, whereupon the shaft 18 and the drive gear 17 thereon may be withdrawn through the aperture 19.

The gear 17 will, of course, be reinserted through the aperture 20, and the grease cap 27 secured to the end wall 16 by means of the nut 29. The nut 24 and the grease cap 28 will then be applied at the location of the aperture 19, so that the coupling portion 30 will then be in operating position projecting outwardly from the end wall 16.

If the operator should desire to employ a right angle drive, he will use the modified form of gear box construction shown in Fig. 3, wherein the drive shaft 53 projects outwardly from the side wall 13 at right angles to the driven shaft 26.

One advantage of the gear box herein disclosed is that it has a high power transmitting capacity confined within a small compact space.

While there have been disclosed in this specification two forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a gear box, a housing, a plurality of symmetrically disposed intermediate gears rotatably mounted on parallel axes fixed with respect to said housing, a driven gear located between said intermediate gears and meshed therewith, a floating annular gear embracing said intermediate gears and meshed therewith and having the same axis as said driven gear, and means for driving said annular gear, the intermeshing teeth of said intermediate and annular gears being of a substantial length and parallel to the axes of rotation thereof, the teeth of said intermediate gears extending beyond the ends of said annular gear, a pair of cylindrical abutment portions being provided on one end of two of said intermediate gears at opposite ends of said floating annular gear for preventing said annular gear from shifting longitudinally on its axis.

GEORGE H. SCHAFFER.

REFERENCES CITED

The following references are of record in the file of this patent:

UNITED STATES PATENTS

| Number | Name | Date |
|---|---|---|
| 1,108,422 | Barnum | Aug. 25, 1914 |
| 1,286,099 | Rae | Nov. 26, 1918 |
| 1,320,645 | Osmondson | Nov. 4, 1919 |
| 1,398,255 | Brubaker | Nov. 29, 1921 |
| 1,583,719 | Ivanoff | May 4, 1926 |
| 1,726,879 | Belanger | Sept. 3, 1929 |
| 1,778,432 | Ramsey | Oct. 14, 1930 |

FOREIGN PATENTS

| Number | Country | Date |
|---|---|---|
| 159,137 | Great Britain | May 12, 1922 |
| 397,421 | Great Britain | Aug. 24, 1933 |